3,563,939
ALUMINO-ORGANIC BINDER COMPOSITIONS
John J. Stevens, Jr., Highland Park, and Charles T. Patrick, Jr., and John Wynstra, Somerville, N.J., assignors to Union Carbide Corporation, a corporation of New York
No Drawing. Filed June 4, 1968, Ser. No. 734,239
Int. Cl. C08g 51/04
U.S. Cl. 260—37          22 Claims

ABSTRACT OF THE DISCLOSURE

Hydrated alumina having a low alkali metal content as a filler for organic compositions.

BACKGROUND OF THE INVENTION

Field of the invention

This invention relates to organic compositions characterized by superior resistance to moisture and by good electrical insulating properties. In one aspect, it relates to compositions made up of an organic binder such as, for example, a cured polyepoxide, intimately admixed with an alumina hydrate filler.

DESCRIPTION OF THE PRIOR ART

As is well known, certain types of electrical equipment subjected to contaminating atmospheric conditions such as moisture, dust, fog and salt frequently fail due to creepage between points of different potentials on the equipment. While the insulating components of electrical equipment desirably include organic materials which are inexpensive and readily molded or otherwise fabricated, it has been a particular disadvantage that the organic constituents of such components tend to form carbonaceous deposits upon exposure to conditions which promote such creepage. These carbonaceous deposits ultimately provide paths of sufficiently low resistance to occasion breakdown of the equipment.

By way of example, in the electrical power field insulators are needed to electrically and physically separate the electrically charged line from ground (e.g., wooden and metal support structures). Organic materials have sometimes been used as the insulating material for such insulators.

In outdoor installations, or others where there may be accumulations of dust, rain and other environmental contaminants, random surface discharges or arcing known as "surface creepage" occurs. These discharge conditions occasion the formation of carbonaceous deposits in the insulation, ultimately yielding low-resistance paths or tracks which destroy further utility of the insulator.

As a result of this disadvantage, organic insulating components have frequently been avoided in the construction if insulators and other electrical equipment wherein such components would be subjected to the influences of creepage electrical discharges, even though these components would otherwise have been attractive.

Heretofore it has been proposed to utilize, as a filler for the various organic insulating materials, a number of inorganic compounds, alumina hydrate being one of the preferred fillers. See e.g., U.S. Pats. 2,768,264; 2,997,526; 2,997,527; 2,997,528; and 3,189,513

Many theories have been advanced to explain the desirable effect of hydrated alumina when it is used as a filler for organic compositions. The water of hydration transforms any formed carbon into volatile products. Water also reduces the activation energy necessary for oxidation to occur. It is also felt that the surface of specific fillers such as alumina hydrate catalyzes the oxidation process. Also, the heat and pressure necessary to release the water of hydration forces this water to blow away any formed carbon.

Hydrated alumina grades normally used for these applications contain alkaline impurities.

SUMMARY OF THE INVENTION

We have found that the presence of such alkaline impurity is in such amounts as to affect physical, electrical and handling properties of the organic composition. This is shown by weight gains in water-boil tests, effect on electrical properties, specifically electrical loss properties and arc resistance properties, and effect on gel times of acid-cured resin systems.

In addition, we have found that a certain particle shape and dimension for the alumina hydrate is particularly advantageous for obtaining optimum physical properties.

Our improved composition is characterized by improved resistance to moisture and is particularly suitable for use as an organic insulating material. Our composition comprises virtually any suitable organic binder in conjunction with an alumina hydrate filler, such filler being characterized in that it contains a very low amount of alkaline metal impurity. By alkaline metal we mean alkali metals from Group I of the Periodic Table, i.e., lithium, sodium and potassium, and alkaline earth metals from Group II of the Periodic Table, i.e., beryllium, magnesium, calcium, strontium and barium. Thus, we have found that the alumina hydrate filler should be characterized by a total alkaline metal content, expressed as metal oxide, of not greater than 0.15% by weight on a dry basis, and preferably not greater than 0.10% by weight. In addition, we have found that it is essential that the total soluble alkaline metal content of the alumina hydrate, expressed as metal oxide, be not greater than 0.050% by weight, and preferably not greater than 0.019% by weight.

DESCRIPTION OF THE PREFERRED EMBODIMENTS

Alumina hydrate used in this invention is defined by the chemical formula $Al_2O_3 \cdot xH_2O$, wherein $x$ has any value between 1 and 3. Alumina trihydrate, $Al_2O_3 \cdot 3H_2O$, is particularly preferred. As noted, it is essential that such alumina hydrate have a total alkaline metal content, expressed as metal oxide, of not greater than 0.15% by weight, preferably not greater than 0.1% by weight, and a soluble alkaline metal content, expressed as metal oxide, not greater than 0.05% by weight, and preferably not greater than 0.019% by weight.

Commercially available "pure" alumina hydrates are generally relatively free of most alkaline metals. Such commercial alumina hydrates do contain, however, sodium as an impurity. Thus, when we make reference to an alumina hydrate having "a low alkaline metal content," inasmuch as sodium is the chief alkaline metal present, then as a practical matter, in most instances such reference will relate to an alumina hydrate having a low sodium content. For instance, where our most preferred filler is employed, alumina trihydrate, and assuming the absence of alkaline metal impurities other than sodium, such filler is characterized as follows:

| Property | Range, percent | Preferred range, percent |
|---|---|---|
| Total sodium content, expressed as Na₂O (calcined wt. basis) | ≤0.15 | ≤0.10 |
| Soluble sodium content, expressed as Na₂O (calcined wt. basis) | ≤0.050 | ≤0.019 |
| Al₂O₃ | 60–65 | 64–65.5 |

Although not essential, it is desirable that our alumina hydrate be further characterized by the following:

| Property | Range | Preferred range |
|---|---|---|
| $SiO_2$ | [1] <0.02 | [1] <.01 |
| $Fe_2O_3$ | [1] <0.02 | [1] <.008 |
| $H_2O$, absorbed | [1] <0.5 | [1] <0.2 |
| Bulk density, loose, lbs./ft.[3] | 10–110 | 40–80 |
| Bulk density, packed, lbs./ft.[3] | 20–130 | 50–100 |
| Specific gravity, gm./cc. | 2.42 | 2.42 |
| Average particle size, microns | 1–100 | 6–10 |
| Through 325 mesh | 15–99 | 85–99 |
| Particle type | ([2]) | ([2]) |

[1] Percent.
[2] Crushed precipitate.

Hydrated alumina commercially available is generally obtained as an intermediate in the industrial manufacture of aluminum. It is made from bauxite by a series of steps which includes treatment with alkali. The hydrated alumina is precipitated in the form of smooth, rounded particles. As previously noted, however, we have found that improved physical properties result when such hydrated alumina particles are further processed, as by crushing, to thereby form rough, irregularly shaped particles. Such rough particles have markedly better reinforcing characteristics.

In the foregoing refining steps some alkali is left in the hydrated alumina (some of it incorporated in the crystal lattice) which does not appear to interfere in the further steps of calcining to alumina and of electrolysis to the metal. The alkaline impurity does, however, have an adverse effect when used as a filler for various organic binders, such as, e.g., polyepoxides and the like. For example, when a polyepoxide is cured by means of an acidic catalyst, the alkaline metal impurity tends to neutralize and hence deactivate the catalyst, resulting in a poor cure.

In addition, and although the explanation is not readily apparent, we have found that the presence of the alkaline metal impurity results in a relatively poor behavior of the filler-binder composition when exposed to water. This is distinctly undesirable, inasmuch as one of the main uses of alumina-filled organic compositions is in outdoor applications. Any tendency toward moisture pickup will ordinarily adversely affect both electrical and physical properties.

Table I gives an analysis of two samples of hydrated alumina illustrating, respectively, a commercially available alumina (Type B) and a low sodium alumina useful in our invention (Type A).

TABLE I.— HYDRATED ALUMINAS ($Al_2O_3 \cdot 3H_2O$)

| Sample | A | B |
|---|---|---|
| Total sodium content (as $Na_2O$) (calcined wt. basis) | [1] 0.569 | [1] 0.2 |
| Soluble sodium content (as $Na_2O$) (calcined wt. basis) | [1] 0.018 | [1] 0.07 |
| $Al_2O_3$ | 65.2 | 65 |
| $SiO_2$ | 0.008 | 0.005 |
| $Fe_2O_3$ | 0.003 | 0.002 |
| $H_2O$, absorbed | 0.04 | 0.1 |
| Bulk density, packed, lb./ft.[3] | 90 | 77 |
| Average particle size, microns | 10 | |
| Particle type | ([2]) | ([2]) |

[1] Percent.
[2] Crushed precipitate.

Hydrated alumina A is an example of the unusually low-alkaline alumina that is used in accordance with the present invention. It is to be noted that alumina A is low both in total and in water-soluble sodium content. Hydrated alumina B represents a typical hydrated alumina commercially available and is considered to represent relatively "pure," low-alkaline hydrated alumina. Note that both the total sodium contents and the soluble sodium contents of this alumina is higher than the corresponding values for alumina A.

It is to be understood that the expression "soluble alkaline metal content" or "soluble sodium content" refers to alkaline metal content or sodium metal content of the alumina hydrate that is soluble in and hence extractable by water. Generally, alkaline metal that is present in such soluble form is in the form of a metal salt.

In determining soluble alkaline metal content, we employ the following procedure. A 5 gram sample of alumina hydrate is placed in a 400 cc. beaker. 200 grams of distilled water are added. The whole is boiled gently for one hour and then cooled to 25° C. and transferred to a 500 cc. flask. Distilled water is added to the level marker (500 cc. total volume), and the flask is then shaken and permitted to stand, followed by filtration. The soluble alkaline metal content of the filtrate is measured using a Beckmann DV flame spectrophotometer.

As will be demonstrated by the examples hereinafter, our use of a very low-alkaline alumina hydrate as a filler for various organic compositions affords considerable advantages as compared to the use of commercial "pure" alumina hydrates currently available.

In its broadest aspect, our invention contemplates the use of such low-alkaline alumina (for instance, alumina A of Table I) as a filler for a wide variety of organic binder materials. Suitable organic binder materials include, for example, cured polyepoxides; polyester resins; butyl gums and/or rubbers; silicone gums and/or rubbers; other rubbers such as urethane rubbers, rubbery copolymers of butadiene with styrene, acrylonitrile, or both; ethylene/propylene copolymer rubber; ethylene/propylene/termonomer rubber; thermoplastics such as e.g., polyethylene, polypropylene, ethylene-propylene copolymer, polycarbonates, polysulfones, polyphenylene oxides, polyamides, vinyl polymers and copolymers, acrylics, such as polymethyl methacrylate, etc.; thermoset resins such as phenol-formaldehyde and urea-formaldehyde condensates; etc.

A preferred organic binder system for use with our low-alkaline alumina hydrate filler comprises a polyepoxide in conjunction with a curing agent therefor.

The polyepoxide materials which are contemplated are those which have more than one vicinal epoxy group, i.e., more than one

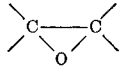

group, which group may be in a terminal position, i.e., a

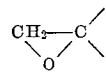

group, or in an internal position, i.e., a

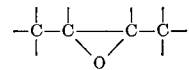

group. The polyepoxides may be aliphatic, cycloaliphatic, aromatic, or heterocyclic, and may be substituted with substituents such as hydroxyl, alkyl, alkoxy, etc.

Illustrative of the polyepoxides which are contemplated include, for example, the epoxy polyethers of polyhydric phenols obtained by reacting a polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl)propane (Bisphenol-A), 2,2-bis(4-hydroxyphenyl)butane, 4,4'-dihydroxybenzophenone, bis(4-hydroxyphenyl)ethane, 2,2-bis(4-hydroxyphenyl)pentane and 1,5-dihydroxynaphthalene. The halogen-containing epoxides may be further exemplified by 3-chloro-1,2-epoxybutane, 3-bromo-1,2-epoxyhexane, 3-chloro-1,2-epoxyoctane, and the like. By varying the ratios of the phenol and epichlorohydrin one obtains different molecular weight products as shown in U.S. 2,633,458.

A preferred group of the above-described epoxy polyethers of polyhydric phenols are polyglycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for several hours to effect the reaction and the product is then washed free of salt and base.

A preferred class of polyepoxides are the diglycidyl polyethers of dihydric phenols which have the following formula:

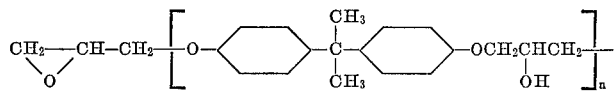

wherein n has a value from zero to about 10, preferably from 0 to about 2.

Additionally preferred polyepoxides which are contemplated are those which contain at least one oxirane oxygen atom bonded to two vicinal cycloaliphatic carbon atoms. In different language, the polyepoxide component contains at least one vicinal epoxy group, i.e.,

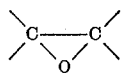

the epoxy carbon atoms of which form a portion of a cycloaliphatic hydrocarbon nucleus. The cycloaliphatic nucleus preferably contains from 5 to 7 carbon atoms including the epoxy carbon atoms. Saturated polyepoxides which contain all the oxirane oxygen atoms bonded to vicinal cycloaliphatic carbon atoms are preferred. Of course, it is readily apparent to epoxy chemists that only one oxirane oxygen can be chemically bonded to any pair of vicinal or adjacent carbon atoms. Saturated diepoxides which contain both oxirane oxygen atoms bonded to cycloaliphatic carbon atoms are highly preferred. Polyepoxides which contain solely carbon, hydrogen, and oxygen atoms are especially preferred. The oxygen atoms can be (in addition to oxirane oxygen) etheric oxygen, i.e., —O—; oxygen present in an ester group, i.e.,

oxygen present in a carbonyl group, i.e.,

and the like. A single polyepoxide or a mixture of at least two polyepoxides can be employed in the novel curable compositions.

Illustrative polyepoxides includes, for example, the alkanediol bis(3,4-epoxycyclohexanecarboxylates), the alkanediol bis(lower alkyl substituted-3,4-epoxycyclohexanecarboxylates), the oxaalkanediol bis(lower alkyl substituted-3,4-epoxycyclohexanecarboxylates), the alkanetriol tris(3,4-epoxycyclohexanecarboxylates), the alkenetriol tris(lower alkyl substituted-3,4-epoxycyclohexanecarboxylates), the oxaalkanetriol tris(3,4-epoxycyclohexanecarboxylates), the oxaalkanertiol tris(lower alkyl substituted-3,4-epoxycyclohexanecarboxylates), and the like. The expression "lower alkyl" as used herein means an alkyl radical which contains from 1 to 4 carbon atoms.

Other polyepoxides contemplated include, for instance, the bis(3,4-epoxycyclohexylmethyl) hydrocarbon dicarboxylates and the bis(lower alkyl substituted-3,4-epoxycyclohexylmethyl) hydrocarbon dicarboxylates, e.g., bis-(3,4-epoxycyclohexylmethyl) oxalate, bis(3,4-epoxycyclohexylmethyl) malonate, bis(3,4-epoxycyclohexylmethyl) succinate, bis(3,4-epoxycyclohexylmethyl) glutarate, bis-(3,4-epoxycyclohexylmethyl) adipate, bis(3,4-epoxycyclohexylmethyl) tetrahydrophthalate, bis(3,4-epoxycyclohexylmethyl) hexahydrophthalate, bis(3,4-epoxycyclohexylmethyl) phthalate, and the like.

Other desirable polyepoxides include the monoesters of 3,4-epoxycyclohexylmethanols and 3,4-epoxycyclohexanecarboxylic acids such as, for example, 3,4-epoxycyclohex-

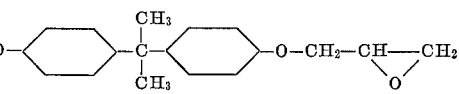

ylmethyl 3,4-epoxycyclohexane carboxylate, 1-methyl-3,4-epoxycyclohexylmethyl 1 - methyl-3,4-epoxycyclohexanecarboxylate, 6-methyl-3,4-epoxycyclohexylmethyl 6-methyl-3,4-epoxycyclohexanecarboxylate, 2-ethyl-3,4-epoxycyclohexylmethyl 2-ethyl-3,4-epoxycyclohexanecarboxylate, 4-n-propyl - 3,4 - epoxycyclohexylmethyl 4-n-propyl-3,4-epoxycyclohexanecarboxylate, 5 - isobutyl-3,4-epoxycyclohexylmethyl 5-isobutyl-3,4-epoxycyclohexanecarboxylate, lower alkyl substituted-3,4-epoxycyclohexylmethyl lower alkyl substituted-3,4-epoxycyclohexanecarboxylate, halo substituted-3,4-epoxycyclohexylmethyl halo substituted-3,4-epoxycyclohexanecarboxylate, 1 - chloro-3,4-epoxycyohexylmethyl 1-chloro-3,4-epoxycyclohexanecarboxylate, 2-bromo-3,4-epoxycyclohexylmethyl 2 - bromo-3,4-epoxycyclohexanecarboxylate, and the like.

Further useful polyepoxides which are contemplated include, for example, 4-vinylcyclohexene dioxide, dicyclopentadiene dioxide, bis(2,3-epoxycyclopentyl) ether, bis-(3-oxatetracyclo[4.4.0.1$^{7,10}$.0$^{2,4}$]undec-8-yl) ether, and the like.

Curing agents for the foregoing polyepoxides include suitable curing catalysts and/or organic hardeners.

Basic and acidic catalysts which can be employed in the curable compositions include, for example, the metal halide Lewis acids, e.g., boron trifluoride, aluminum chloride, zinc chloride, stannic chloride, ferric chloride, boron trifluoride-piperidine complex, boron trifluoride-1,6-hexanediamine complex, boron trifluoride-monoethylamine complex, boron trifluoride-dimethyl ether complex, boron trifluoride diethyl ether complex, boron trifluoride-dipropyl ether complex, and the like; the strong mineral acids, e.g., sulfuric acid, phosphoric acid, polyphosphoric acid, perchloric acid, and the like; the saturated aliphatic hydrocarbon sulfonic acids and the aromatic hydrocarbon sulfonic acids, e.g., ethylsulfonic acid, propylsulfonic acid, benzenesulfonic acid, toluenesulfonic acid, naphthalenesulfonic acid, lower alkyl substituted-benzene-sulfonic acid, and the like; the alkali metal hydroxides, e.g., sodium hydroxide, potassium hydroxide, and the like; the amines, e.g., alphamethylbenzyldimethylamine, dimethylethylamine, triethylamine, tripropylamine, trimethylammonium hydroxide, and the like. When the catalyst and curable compositions are immiscible, the catalyst can be added as a solution in an inert normally-liquid organic medium. Typical media for the catalysts include the organic ethers, e.g., diethyl ether, dipropyl ether, and the like; the organic esters, e.g., methyl acetate, ethyl acetate, methyl propionate, ethyl propionate, and the like; the organic ketones, e.g., acetone, cyclohexanone, methylcyclohexanone, and the like.

Where a catalyst is utilized, the amount employed will, of course, vary depending upon the particular catalyst selected and the nature of the polyepoxide. Generally, the amount of catalyst used will be up to about 10 percent by weight of the polyepoxide.

Hardeners that may be used to cure the polyepoxide include various polyfunctional materials capable of reacting with the polyepoxide, such as, e.g., polycarboxylic acids (including polycarboxy polycaprolactone); polyfunctional amines (containing at least two —NHR groups wherein R may be H or an organic radical such as alkyl, cycloalkyl, or aryl, such radical optionally being substituted); polyols such as polyhydric alcohols, polyhydric phenols, polycaprolactone polyols; polycarboxylic acid anhydrides; etc.

Polycarboxylic acid anhydrides constitute a preferred class of hardeners. Suitable polycarboxylic acid anhydrides include the aliphatic, aromatic, and cycloaliphatic acid anhydrides. Illustrative polycarboxylic acid anhydrides include, for example, phthalic anhydride, tetrahydrophthalic anhydride, hexahydrophthalic anhydride, chlorenic anhydride, glutaric anhydride, adipic anhydride, tetrahydrophthalic anhydride, 1,2-naphthalic anhydride, and the like.

A particularly preferred system in accordance with our invention utilizes our low-alkaline alumina hydrate filler in conjunction with (1) a cycloaliphatic polyepoxide of the foregoing type, (2) a polycarboxylic acid anhydride, (3) a polyol, desirably a polycaprolactone polyol, and optionally (4) a lactone, by way of example, epsilon-caprolactone, zeta-enantholactone, or eta-caprylolactone, with epsilon-caprolactone being preferred.

Suitably polyols which may be employed as a component in the curable formulations include those organic compounds which have at least two hydroxyl groups, which are alcoholic hydroxy groups, phenolic hydroxy groups, or both alcoholic and phenolic hydroxy groups. The term "polyol" preferably encompasses the polyhydric alcohols and the polyhydric phenols. The polyhydric alcohols, i.e., those composed solely of carbon, hydrogen, and oxygen, are highly preferred. Illustrative of the polyols contemplated include, for example, the aliphatic and cycloaliphatic polyhydric alcohols, e.g., ethylene glycol, diethylene glycol, the polyethylene glycols, propylene glycol, the polypropylene glycols, the polyethylenepolypropylene glycols, trimethylene glycol, the butanediols, the pentanediols, 2-ethyl-1,3-hexanediol, the hexenediols, 2-methoxy-2,3-dimethyl-1,5-pentanediol, polyglycerol, 1,1,1-trimethylolpropane, pentaerythritol, sorbitol, the polyvinyl alcohols, resorcinol, catechol, pyrogallol, hydroquinone, the dihydroxytoluenes, dihydroxyxylene, 1,9-naphthalenediol, and the like. The alkylene oxide adducts, e.g., ethylene oxide, propylene oxide, etc., of polyhydric alcohols or polyhydric phenols such as those illustrated above also are highly suitable. Mixtures of polyols are also suitable.

The initiated polycaprolactone polyols and/or polycaprolactone polycarboxys (hereinafter termed initiated products for sake of brevity) which contain free hydroxyl groups and/or carboxyl groups represent preferred polyols. These initiated products are formed by reacting, at an elevated temperature, for example, at a temperature of from about 50° C. to about 250° C., an admixture containing a lactone and polyfunctional organic initiator; said lactone being in molar excess with relation to said initiator; said lactone having from six to eight carbon atoms in the lactone ring and at least one hydrogen substituent on the carbon atom which is attached to the oxy group in said ring; said organic initiator having at least two reactive hydrogen substituents preferably of the group of hydroxyl, primary amino, secondary amino, carboxyl, and mixtures thereof, each of said reactive hydrogen substituents being capable of opening the lactone ring whereby said lactone is added to said initiator as a substantially linear group thereto; said initiated lactone polyesters possessing, on the average, at least two of said linear groups, each of said linear groups having a terminal oxy group at one end, a carbonyl group at the other end, and an intermediate chain of from five to seven carbon atoms which has at least one hydrogen substituent on the carbon atom in said intermediate chain that is attached to said terminal oxy group. These initiated products will contain at least two hydroxyl groups and/or at least two carboxyl groups or mixtures of such groups, depending, of course, on the initiator and reactants employed. (A more complete discussion of such polycaprolactone polyols and polycaprolactone polycarboxys is given in U.S. Pat. 3,169,945, the contents of which are incorporated herein by reference.)

It is desirable that the relative proportions of polyepoxide, polycarboxylic acid anhydride, and polyol comprising the curable composition are such as to provide from about 0.16 to about 5.0 carboxy groups, —COOH, of said anhydride and up to about 2.0 hydroxy groups, —OH, of said polyol per epoxy group of said polyepoxide.

It should be noted that by the expression "carboxy groups of said polycarboxylic acid anhydride" is meant the carboxy groups which would be contained by the corresponding polycarboxylic acid. In other words, by the expression "carboxy groups of polycarboxylic acid anhydride" is meant the carboxy groups contained in the "hydrated" polycarboxylic acid anhydride.

It is preferred that the relative proportions of polyepoxide, polycarboxylic acid anhydride, and polyol are such as to provide from about 0.33 to about 4.0 carboxy groups of said anhydride and from about 0.16 to about 2.0 hydroxy groups of said polyol, per epoxy group of said polyepoxide.

As previously noted, a preferred system in accordance with our invention utilizes our low-alkaline alumina hydrate filler in conjunction with (1) a cycloaliphatic polyepoxide, (2) a polycarboxylic acid anhydride, (3) a polyol, and optionally (4) a lactone.

Although a caprolactone is preferred in the foregoing system, it is to be noted that other lactones also are suitable. In general, the lactone should contain from 3 to 8 carbon atoms in the heterocyclic ring. Lactones that may be employed include, by way of example, beta-propiolactone; dialkyl-substituted propiolactones such as the dimethyl-, diethyl-, and dipropylpropiolactones, e.g., alpha,alpha-dialkyl-beta-propiolactones such as alpha, alpha - dimethyl - beta-propiolactone; delta-valerolactones such as methyl- and ethyl-substituted delta-valerolactones; epsilon caprolactone; and substituted epsilon-caprolactones such as mono-, di-, and trialkyl substituted epsilon-caprolactones, e.g., methyl- and ethyl-substituted epsilon-caprolactones; zeta-enantholactone; eta-caprylolactone; and the like.

The amount of lactone employed may vary within considerable limits, depending upon the specific components of the curable system and the degree of fluidity desired. A suitable range for the lactone is from about zero to 13 moles of lactone per epoxy group of the polyepoxide. A more preferred range is from about one-half to 7.5 moles of lactone per epoxy group of the polyepoxide.

The relative proportions as between our low-alkaline alumina hydrate filler and organic binder may vary widely. Generally, the alumina hydrate filler will comprise from about 10 to 80 percent by weight of the over-all filled composition (filler plus binder), although higher or lower amounts occasionally may be employed. A more preferred range for the alumina hydrate is from about 20 to 70 percent by weight of the over-all filled composition, with the most preferred range being from about 40 to 65 percent by weight.

The incorporation of our low alkaline alumina hydrate filler into the organic binder is generally accomplished by simple blending. Thereafter, the resulting filled composition can be formed by any of the usual techniques well known in the art, e.g., casting, molding, impregnating, dipping, encapsulating, etc.

As pointed out previously, while not essential, it is desirable that our alumina hydrate filler be in particulate form with the particles being of irregular shape rather than of the smooth, rounded configuration obtained by conventional precipitation techniques. Such irregularly shaped particles are readily obtained by fracturing the smooth precipitate particles, as by crushing. These irregularly shaped particles have a markedly superior reinforcing capability for the organic binder.

The following examples will further illustrate our invention and will demonstrate the improvements attainable by the use of a low alkaline metal alumina as compared to a conventional commercial alumina. All parts are by weight unless otherwise indicated.

Examples 1–4

In these examples, all of which relate to the use of a polyepoxide as the organic binder, the general procedure was as follows. The particular amounts of ingredients employed are shown in Table II hereinafter. The specified batch amount of polyepoxide and polyol were mixed together. Previously, hexahydrophthalic anhydride had been preheated to 40° C. and melted. The molten curing agent was then added to the mixture of polyepoxide and polyol. Alumina trihydrate filler which previously had been preheated to 100° C. for about 12 hours was then added, and the whole was subjected to high shear mixing (Cowles dissolver) for about 5 minutes. The catalyst solution (uranyl nitrate in ethylene glycol) was then added dropwise. The whole was mixed for about one minute and then 30 grams of the mix was poured into a dish to determine gel time at 120° C. Additionally, plaques of the mixes were cured for a total period of 2 hours at 120° C., followed by post curing for 4 hours at 160° C. The results reported where obtained on these cured plaques. The specific materials employed, their amounts and the results obtained are set out in Table II.

TABLE II

| Example Number | 1 | 2 | 3 | 4 |
|---|---|---|---|---|
| Parts by weight: | | | | |
| 3,4-epoxycyclohexylmethyl 3,4-epoxycyclohexanecarboxylate | 30 | 30 | 30 | 30 |
| "Niax LG-240" [1] | 20 | 20 | 20 | 20 |
| Hexahydrophthalic anhydride | 17 | 17 | 17 | 17 |
| 20% uranyl nitrate in ethylene glycol | .13 | .13 | .26 | .26 |
| Hydrated alumina: | | | | |
| Alumina A of Table I | 100 | | 100 | |
| Alumina B of Table I | | 100 | | 100 |
| Gel time 120° C., hrs | 0.5 | 6–18 | 0.2 | 6–18 |
| Wt. gain after 4 hr. $H_2O$ boil, percent | | | 0.9 | 1.5 |
| Electrical properties: | | | | |
| Arc resistance, sec. (ASTM D–495) | 271 | 188 | 287 | 164 |
| 60 Hz. dissipation factor (ASTM D–150) at— | | | | |
| 25° C | | | .03 | .07 |
| 50° C | | | .07 | .08 |
| 75° C | | | .06 | .11 |
| 100° C | | | .06 | .25 |
| 125° C | | | .17 | .74 |
| 150° C | | | .41 | .97 |
| 60 Hz. dielectric constant (ASTM D–150) at— | | | | |
| 25° C | | | 4.6 | 5.4 |
| 50° C | | | 5.5 | 7.1 |
| 75° C | | | 6.7 | 7.5 |
| 100° C | | | 6.8 | 7.4 |
| 125° C | | | 6.8 | 8.7 |
| 150° C | | | 7.1 | 10.2 |

[1] Propylene oxide adduct of glycerol; molecular weight~700; hydroxyl number=240.

Referring to Table II, it will be noted that in Example 1, wherein our low-alkaline alumina was employed, a rapid gel time ensued, namely, one-half hour. By contrast, using a commercial alumina in Example 2 resulted in a gel time of between 6 and 18 hours. (Gelled overnight.)

Where the catalyst level was doubled, in Examples 3 and 4, Example 3 using our low-alkaline alumina gave a rapid gel time of about 12 minutes, whereas in Example 4 the commercial alumina gave a gel time of between 6 and 18 hours. (Gelled overnight.) The use of our low-alkaline alumina also resulted in a distinctly lower water boil weight gains as compared to the use of commercial alumina. Compare Example 3 with Example 4.

An important end use envisioned for the products of this invention, such as the products of Table II, is in the manufacture of electrical insulators and bushings. For these applications, the material's tendency not to form low resistance carbonaceous deposits under the influence of electrical discharges is an important performance characteristic. One measure of the resistance of material to carbon formation under electrical arc is the ASTM D–495 arc resistance test. In this test a 16,000 volt, low amperage arc is intermittently or continuously struck across a ¼-inch surface of the material. This electrical stress will eventually cause breakdown of an organic material, oxidizing most of it to volatile products such as CO, $CO_2$, $H_2O$, etc. Incomplete oxidation may lead to carbon formation which may become so great that the arc cannot be supported. The material is said to "track" under this condition. The time to reach this point is defined as the arc resistance of a material.

The ASTM D–495 test is set up so that the electrical stress severity doubles every 60 seconds. Thus, the test results do not bear a linear relationship to performance. Although no rules exist to interpret the test results, the following guide is believed to be appropriate:

| ASTM D–495 value | Classification |
|---|---|
| 0–40 secs. | Poor. |
| 40–75 | Fair. |
| 75–130 | Good. |
| 130–240 | Very good. |
| >240 | Excellent. |

Generally, regardless of its tracking resistance, an unfilled organic material cannot be tested beyond 120–180 seconds because the material is burning so intensely that one cannot observe tracking. Fillers generally do improve the arc resistance value.

The electrical test data in Table II shows clearly superior performance when using our low-alkaline alumina. Compare the arc resistance for Examples 3 and 4.

Two other important characteristics of a good insulating material are its dissipation factor and its dielectric constant. These characteristics are particularly important in the electrical power field. Thus, the greater the amount of electrical energy that is lost in heat, the less efficient is the insulating material. Moreover, it is possible for the electrical loss value to become so great that electrical energy from the conductor would be sufficiently diverted so as to cause severe heating and hence degradation of the insulating material. Thus, the lower the values for dissipation factor and dielectric constant, the better are the insulating characteristics of the material. While no specific maximum for the dissipation factor can be positively stated, in general, a dissipation factor value of less than 0.10 is a desirable property for an insulating material.

Referring to Table II, Examples 3 and 4, it is apparent that Example 3, wherein our low alkaline alumina filler was employed, offers consistently superior insulating properties, as measured by the values for the dissipation factor and the dielectric constant, as compared to Example 4 wherein a commercial "pure" alumina filler was employed.

Examples 5–10

The procedure described in Examples 1–4 was followed. The particular materials employed, their amounts, and the results obtained are given in Table III.

TABLE III

| Example Number | 5 | 6 | 7 | 8 | 9 | 10 |
|---|---|---|---|---|---|---|
| Parts by weight: | | | | | | |
| 3,4-epoxycyclohexylmethyl 3,4-epoxycyclohexanecarboxylate | 30 | 30 | 38 | 38 | 35.8 | 35.8 |
| Niax LG-240 | 20 | 20 | 25 | 25 | 23.8 | 23.8 |
| Hexahydrophthalic anhydride | 17 | 17 | 17 | 17 | 20.4 | 20.4 |
| Stannous octoate | .5 | .5 | | | | |
| 20% uranyl nitrate in ethylene glycol | | | .15 | .15 | .15 | .15 |
| Alumina A of Table I | 101.5 | | 120 | | 120 | |
| Alumina B of Table I | | 101.5 | | 120 | | 120 |
| Boiling $H_2O$ (7 hours): | | | | | | |
| Hardness, Durometer D, before | 87 | 86 | 64 | 32 | 76 | 78 |
| Hardness, Durometer D, after | 85 | 74 | 21 | ([1]) | 48 | 34 |
| Percent weight gain | 1.1 | 1.4 | 2.2 | ([1]) | 1.8 | 2.0 |
| Thermal stability, 215° C.: | | | | | | |
| Percent wt. loss after 48 hrs | | | 3.4 | ([1]) | 3.6 | 3.8 |
| Percent wt. loss after 90 hrs | 4.1 | 4.4 | | | | |
| Percent wt. loss after 144 hrs | | | 5.9 | ([1]) | 5.1 | 6.2 |

[1] Sample completely disintegrated; could not measure results.

Referring to Table III and comparing Examples 5, 7, and 9, wherein our low-alkaline alumina was employed, with Examples 6, 8, and 10, respectively, wherein a commercial "pure" alumina was employed, in each instance our low-alkaline alumina filled product showed better performance characteristics, both as regards (1) resistance to water (as measured by hardness and by weight gain) and (2) thermal stability.

Examples 11–18

The procedure described in Examples 1–4 was followed for Examples 11–16. In Examples 17 and 18, the procedure was similar, however, in each of these examples the filled composition was cured overnight at room temperature, then given a two hour post cure at 100° C. (instead of a four hour post cure at 160° C.). The particular materials employed, the amounts thereof, and the results obtained are given in Table IV.

an organic material containing two or more oxirane oxygens. Polyepoxides as so defined are disclosed, e.g., in Phillips et al., Pats. 2,890,195, 2,890,196, 2,890,197, and 2,890,209, Castan Pats. 2,324,483 and 2,444,333, British Pats. 518,057 and 579,698, and in U.S. Pats 2,494,295, 2,500,600, 2,511,913, and 2,691,007.

The term "polyester resin" is also art recognized and refers to a material comprising the reaction product of a polyhydric saturated or unsaturated alcohol and a saturated or unsaturated polybasic acid either with or without a modifying unsaturated monomer such as styrene, etc. Specific examples of the basic material are, for instance, diethylene glycol maleate, dipropylene glycol maleate, diethylene glycol fumarate and so forth. Such materials are readily polymerized by peroxy catalysts such as benzoyl peroxide, tertiary butyl perbenzoate, etc.

The term "Butyl rubber" or "Butyl gum" is intended to mean broadly, a solid rubbery copolymer or inter-

TABLE IV

| Example No. | 11 | 12 | 13 | 14 | 15 | 16 | 17 | 18 |
|---|---|---|---|---|---|---|---|---|
| Bis(3,4-epoxy-6-methyl-cyclohexylmethyl)adipate | 120.8 | 120.8 | | | | | | |
| Diglycidyl ether of Bisphenol A [a] | | | | | | | 128 | 128 |
| Butyl glycidyl ether | | | | | | | 17.4 | 17.4 |
| Bis(2,3-epoxycyclopentyl)ether | | | | | 129.5 | 129.5 | | |
| 3,4-epoxy-6-methylcyclohexylmethyl 3,4-epoxy-6-methylcyclohexanecarboxylate | | | 108.4 | 108.4 | | | | |
| Polyether diol [b] | 27.4 | 27.4 | | | | | | |
| Triol [c] | | | 19.2 | 19.2 | | | | |
| Epsilon caprolactone | 12.6 | 12.6 | 20.8 | 20.8 | | | | |
| Mesyl nadic anhydride | 39.2 | 39.2 | | | | | | |
| Diethylenetriamine-acrylonitrile adduct [d] | | | | | | | 54.6 | 54.6 |
| Methyltetrahydrophthalic anhydride | | | 51.6 | 51.6 | | | | |
| Methylene dianiline [e] | | | | | 70.5 | 70.5 | | |
| Alumina B of Table I | 300 | | 300 | | 300 | | 300 | |
| Alumina A of Table I | | 300 | | 300 | | 300 | | 300 |
| Stannous octoate | 1.0 | 1.0 | | | | | | |
| 20% uranyl nitrate in ethylene glycol | | | 1.0 | 1.0 | | | | |
| Percent wt. gain after 7.5 hr. H₂O boil | 2.43 | 1.73 | 2.73 | 1.39 | 1.01 | .74 | 2.98 | 2.35 |
| 60 Hz. dissipation factor at— | | | | | | | | |
| 25° C | .04 | .04 | .02 | .01 | .02 | .01 | .07 | .05 |
| 50° C | .07 | .07 | .04 | .02 | .03 | .02 | .20 | .17 |
| 75° C | .11 | .11 | .08 | .04 | .06 | .03 | 1.27 | 1.42 |
| 100° C | .22 | .26 | .11 | .06 | .09 | .04 | | |
| 125° C | .50 | .58 | .15 | .08 | .13 | .07 | | |
| 150° C | | | | | | | | |
| 60 Hz. dielectric constant at— | | | | | | | | |
| 25° C | 5.10 | 4.77 | 4.51 | 4.45 | 5.19 | 5.17 | 6.19 | 6.13 |
| 50° C | 5.90 | 5.87 | 4.85 | 4.52 | 5.34 | 5.29 | 9.99 | 9.19 |
| 75° C | 6.65 | 6.62 | 5.60 | 4.83 | 5.66 | 5.43 | 17.3 | 17.1 |
| 100° C | 6.55 | 6.62 | 5.41 | 5.40 | 6.13 | 5.64 | | |
| 125° C | 6.78 | 6.91 | 6.98 | 6.19 | 6.87 | 5.88 | | |
| 150° C | | | | | | | | |

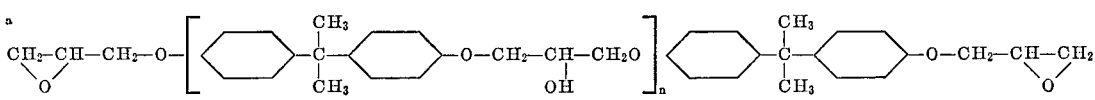

wherein $n = 0$ to about 0.2.

[b] Diol having molecular weight ~1,000; produced by adducting propylene oxide to ethylene glycol.
[c] Polycaprolactone triol of molecular weight about 600; using glycerol as the initiator.
[d] Obtained by reaction of 1 mole of diethylenetriamine with 2 moles of acrylonitrile.

Referring to Table IV and comparing Examples 12, 14, 16, and 18, wherein our low-alkaline alumina was utilized, with Examples 11, 13, 15, and 17, respectively, wherein a commercial alumina was employed, the superior results attainable from our low-alkaline alumina filler are readily apparent. Note particularly the superior resistance to water and, in general, the superior electrical characteristics.

While the foregoing examples have particularly illustrated the applicability of our invention to polyepoxide resin systems, as previously noted, the invention also finds application in connection with the various other organic binders previously mentioned. It thus appears that the use of our alumina hydrate of unusually low alkaline metal content results in markedly improved moisture resistance for the filled composition, and frequently also results in superior electrical characteristics.

As previously noted, the term "polyepoxide" is well known in the art and as used herein is intended to mean polymer comprising the product of polymerization of a mass of copolymerizable materials containing, by weight, a major proportion (e.g., from 60 to 99%) of an olefin (monoolefin) more particularly an isoolefin, e.g., isobutylene, 2-ethyl butene-1, etc., and a minor proportion (e.g., from 1 to 40%) of a conjugated diolefin, e.g., butadiene-1,3, isoprene, cyclopentadiene, pentadiene-1,3, hexadiene-2,4, etc.

The remaining organic binder materials previously referred to, e.g., col. 4 herein, are all, of course, very well known in the art.

Variations can of course be made without departing from the spirit of our invention.

What is claimed is:

1. A composition comprising a curable polyepoxide and a curing agent therefor, said composition having dispersed therein a particulate alumina hydrate filler of the formula $Al_2O_3 \cdot xH_2O$ wherein $x$ has any value from 1 to 3, said filler being characterized on a dry basis by a total alkaline metal content, expressed as metal oxide, not in excess of 0.15 percent by weight and a total water-soluble alkaline metal content not in excess of 0.05 percent by weight, based on the weight of the filler, the particles of said filler having an average particle size of at least one micron.

2. The composition of claim 1 wherein said filler is present in an amount of from about 10 to 80 percent by weight, based on the total weight of binder and filler.

3. The composition of claim 2 wherein the polyepoxide contains at least one oxirane oxygen bonded to two vicinal cycloaliphatic carbon atoms.

4. The composition of claim 3 wherein said polyepoxide is a saturated polyepoxide wherein all the oxirane oxygens are bonded to vicinal cycloaliphatic carbon atoms.

5. The composition of claim 3 wherein said curing agent comprises a polycarboxylic acid anhydride.

6. The composition of claim 5 wherein the amount of said polycarboxylic acid anhydride is such as to provide from about 0.16 to 5.0 carboxy groups per epoxy group of said polyepoxide.

7. The composition of claim 5 which further comprises a polyol.

8. The composition of claim 7 wherein said polyol is a polycaprolactone polyol.

9. The composition of claim 7 wherein the amount of said polycarboxylic acid anhydride is such as to provide from about 0.16 to 5.0 carboxy groups per epoxy group of said polyepoxide and the amount of said polyol is such as to provide up to about 2.0 hydroxy groups per epoxy group of said polyepoxide.

10. The composition of claim 8 which further comprises a lactone having from 3 to 8 carbon atoms in the heterocyclic ring.

11. The composition of claim 8 wherein said polyepoxide is 3,4-epoxycyclohexylmethyl 3,4-epoxycyclohexanecarboxylate and said polycarboxylic acid anhydride is hexahydrophthalic anhydride.

12. The composition of claim 8 wherein said polyepoxide is bis(3,4-epoxy-6-methyl-cyclohexylmethyl) adipate and said polycarboxylic acid anhydride is hexahydrophthalic anhydride.

13. The composition of claim 8 wherein said polyepoxide is bis(2,3-epoxycyclopentyl) ether.

14. The composition of claim 8 wherein said polyepoxide is 3,4-epoxy-6-methylcyclohexylmethyl 3,4-epoxy-6-methylcyclohexanecarboxylate.

15. The composition of claim 10 wherein said lactone is epsilon-caprolactone, said polycarboxylic acid anhydride being present in such amount as to provide from about 0.16 to 5.0 carboxy groups per epoxy group of said polyepoxide, the amount of said polyol being such as to provide up to about 2.0 hydroxy groups per epoxy group of said polyepoxide, and the amount of said epsilon-caprolactone being from about one half to 7.5 mols per epoxy group of said polyepoxide.

16. The composition of claim 1 wherein said total alkaline metal content, expressed as metal oxide, is not in excess of 0.10 percent by weight, and said total water-soluble alkaline metal content is not in excess of 0.019 percent by weight.

17. The composition of claim 16 wherein said alkaline metal consists essentially of sodium.

18. The composition of claim 2 wherein said filler is alumina trihydrate.

19. The composition of claim 18 wherein said alumina hydrate filler is composed of uneven, irregularly shaped particles, said particles having an average particle size of about 6 to 10 microns.

20. The composition of claim 18 wherein said filler is present in an amount of from about 20 to 70 percent by weight, based on the total weight of binder and filler.

21. The composition of claim 18 wherein said filler is present in an amount of from about 40 to 65 percent by weight, based on the total weight of binder and filler.

22. The cured composition of claim 1.

References Cited

UNITED STATES PATENTS

| | | | |
|---|---|---|---|
| 3,000,848 | 9/1961 | McGary et al. | 260—37(Ep)UX |
| 3,202,947 | 8/1965 | Budovec | 260—37(Ep)X |
| 3,268,295 | 8/1966 | Armbrust et al. | 106—288(I)X |
| 3,318,995 | 5/1967 | Buckley et al. | 260—37(Ep)UX |
| 3,405,102 | 10/1968 | Kugler et al. | 260—37(Ep)X |

MORRIS LIEBMAN, Primary Examiner

L. T. JACOBS, Assistant Examiner

UNITED STATES PATENT OFFICE
CERTIFICATE OF CORRECTION

Patent No. 3,563,939     Dated February 16, 1971

Inventor(s) J. J. Stevens, Jr., C. T. Patrick, Jr. and J. Wynstra

It is certified that error appears in the above-identified patent and that said Letters Patent are hereby corrected as shown below:

Claim 13, line 1, change "claim 8" to --claim 1--.

Signed and sealed this 25th day of May 1971.

(SEAL)
Attest:

EDWARD M. FLETCHER, JR.
Attesting Officer

WILLIAM E. SCHUYLER, JR.
Commissioner of Patents